United States Patent [19]

Brilovich et al.

[11] 4,049,566

[45] Sept. 20, 1977

[54] MAGNETIC COATING COMPOSITION

[75] Inventors: Gregorio Brilovich; Irvin F. Masserant, both of San Jose, Calif.

[73] Assignee: Memorex Corporation, Santa Clara, Calif.

[21] Appl. No.: 693,208

[22] Filed: June 4, 1976

[51] Int. Cl.$^2$ .................. B05D 3/14; B05D 5/12; H01F 1/00

[52] U.S. Cl. .................. 252/62.54; 427/48; 427/128; 428/900

[58] Field of Search .................. 427/127, 128; 252/62.53, 62.54; 428/900

[56] References Cited

U.S. PATENT DOCUMENTS

| | | | |
|---|---|---|---|
| 2,914,480 | 11/1959 | Hagopian | 252/62.54 |
| 3,499,789 | 3/1970 | Delimore | 252/62.54 X |
| 3,833,412 | 9/1974 | Akashi et al. | 252/62.54 X |
| 3,955,037 | 5/1976 | Marx et al. | 428/418 |
| 3,977,984 | 8/1976 | Roberts | 252/62.54 |

*Primary Examiner*—F.C. Edmundson

[57] ABSTRACT

A magnetic coating composition is disclosed which comprises a dispersion of magnetic particles in a solution of an epoxy resin having an average of between 1 and 3 epoxy groups per molecule and having an epoxy equivalent in the range about 400 to 4,000 and containing an organic acid which boils below 220° C., the acid being present in amount equal to from 2 to 20% by weight of the contained magnetic particles. Magnetic recording media prepared by coating a substrate with the coating composition, subjecting the coated substrate to a magnetic field to orient the magnetic particles in a desired direction and then heating the coated substrate to evaporate the solvent and cure the resin exhibit high orientation ratios in the range 1.8 to 2.4.

4 Claims, No Drawings

MAGNETIC COATING COMPOSITION

BACKGROUND OF THE INVENTION

Magnetic recording media such as magnetic tapes or magnetic discs are prepared by dispersing magnetic particles in a solution of a resinous binder, coating a substrate with the dispersion, subjecting the coated substrate to the action of a magnetic field to orient the magnetic particles in a desired direction and then heating the coated substrate to evaporate the solvent and set or cure the resin. Orientation of the magnetic particles by action of a magnetic field on the coating before it is dried improves the performance characteristics of the finished recording medium by increasing the signal output and reducing background noise level. Epoxy resins are desirable binder components of magnetic coating compositions and their use results in a hard thermoset coating which is resistant to wear, abrasion, head loading and crash in the course of use. Magnetic coatings produced heretofore using epoxy resins have generally exhibited orientation ratios in the range about 1.1 to 1.6. Higher orientation ratios are desirable since they provide improved performance of the magnetic recording medium. Pursuant to the present invention, magnetic coating compositions employing epoxy resins as all or as the major proportion of the resin component and exhibiting orientation ratios in the range 1.8 to 2.4 are produced. Orientation ratio is the ratio of the strength of the magnetic field of the coating in the direction in which the particles have been oriented divided by the strength of the field in a direction perpendicular to the direction of orientation.

DETAILED DESCRIPTION OF THE INVENTION

Pursuant to the invention, from 2 to 20% by weight of organic acid based on the content of magnetic particles is added to a dispersion of magnetic particles in a solution of an epoxy resin. When the resultant mixture if coated on a substrate and the coated substrate is subjected to the action of a magnetic field to orient the magnetic particles and then the coated substrate is heated to drive off solvent and to set the resin, it is found that the orientation ratio of the resultant magnetic coating is high lying in the range 1.8 to 2.4. The acid component of the composition is desirably, but not necessarily, added in two increments, the first increment of acid being added to a mixture of an epoxy resin solution and magnetic particles prior to conventional milling to divide and suspend the magnetic particles in the liquid phase. After the milling step, the remaining increment of acid is added together with an additional quantity of epoxy resin solution to form a final coating composition having a desired viscosity and magnetic particle concentration.

EXAMPLE I 37.35 parts by weight of cellosolve (the 2-ethoxyethyl ester of acetic acid), one-half part by weight of formic acid, 34.4 parts by weight of finely divided magnetic iron oxide and 27.75 parts by weight of a 60% solution of epoxy resin (EPON 1001 sold by Shell Chemical Company and having an epoxy equivalent weight of 425 to 550 and a melting point in the range 65° to 75° C.) were mixed together and then milled in a Sweco mill to disperse and suspend the magnetic iron oxide particles in the liquid phase.

After the milling was complete, 60 parts by weight of the milled mixture, 8 parts by weight of the same solution of epoxy resin, 30 parts by weight of cellusolve and 2 parts by weight of formic acid were mixed together to form the final coating composition. This coating composition was applied to the surface of aluminum discs using the spin coating technique. The magnetic particles contained in the coatings on the discs were oriented by subjecting them to the action of a magnetic field, then were heated at 230° C. for three hours to evaporate the solvent and set the resin. The orientation ratios of the magnetic particles on the finished discs were determined and found to lie in the range 1.8 to 2.4.

EXAMPLE II 60.1 parts of the milled mixture produced in the Sweco mill in Example I were mixed with 2.4 parts by weight of a 60% solution of EPON 1001, 4 parts by weight of finely divided alumina, and 33.5 parts by weight of a 10% solution of Butvar B-74 solution (a polyvinyl butyral resin manufacture by Monsanto Chemical Company having a molecular weight in the range 100,000 to 150,000) and 2 parts by weight of formic acid were intimately mixed together to form a final coating composition. This composition was applied to aluminum discs, subjected to orientation and thermal cure as in Example I and the orientation ratios of the magnetic coatings of the discs were measured as in Example I and again found to lie in the range 1.8 to 2.4.

In Examples I and II, the formic acid is added in two increments, the smaller increment being added to the mixture fed to the Sweco mill and the larger increment being added when the milled material is mixed with additional solvent. The acid may be added, however, in a single increment if desired. All of the acid may be added to the mill mix, but if this course is followed, then the total amount of acid added should be held in the range about 1 to 7% by weight based on the weight of the contained magnetic particles. If larger amounts of acid are added at this stage, the viscosity of the milled mixture becomes too high. Alternatively, all of the acid may be added after the magnetic particles and solution of epoxy resin have been milled together. When all of the acid is added to the milled mixture, then the quantity of acid added may lie in the range 2 to 20% by weight based on the weight of magnetic particles present in the composition.

Formic acid is the preferred acid for use pursuant to the invention and its use is illustrated in Examples I and II. It has been found, however, that organic acids boiling below 220° C. and preferably below 200° C., such as acetic acid, propionic acid, butyric acid, salicylic acid, pentanoic acid, oxalic acid and the like may be substituted for formic acid in the working examples and will produce finished magnetic recording media having high orientation ratios generally above 1.8 and in the range 1.8 to 2.4. The total quantity of acid employed is a quantity amounting to from 2 to 20% based on the weight of magnetic particles contained in the coating composition. When acids of higher molecular weight but still boiling below 220° C. are used, larger amounts within the indicated range are employed since these acids have higher molecular weights than formic acid and the larger weight quantity may be required to provide equivalent functional acid content.

The solvent employed in forming the magnetic coating composition may be any organic solvent which has the capability to dissolve the epoxy resin and which is inert to the several components of the composition. The solvents should also be sufficiently volatile that they are completely evaporated at temperatures below about 200° C. Cellusolve, methylethyl ketone, diethylene glycol dimethyl ether, carbitol and similar oxygenated organic solvents may be employed either along or mixed with hydrocarbons such as toluene or the xylenes.

The magnetic particles employed are ordinarily magnetic iron oxide particles such as those manufactured by Charles Pfizer Company and sold under the name MO-2530. Ferromagnetic particles in which iron oxide is modified with materials such as cobalt and nickel may be employed in the manufacture of the coating compositions.

The general properties of suitable epoxy resins suitable for use in the preparation of the coating composition include an average epoxy group content per molecule of 1 to about 3 and epoxy equivalents in the range about 400 to 4,000. Suitable epoxy resins are commercially available such as EPON 1001, EPON 1004 and EPON 1007 manufactured by Shell Chemical Company and D.E.R. 661 and 664 manufactured by Dow Chemical Company, and EER-2011 and EER-2013 manufactured by Union Carbide are among the commercially available suitable epoxy resins.

The abrasive material shown in the working examples is a material which may be optionally included for the purpose of increasing the resistance of the finished coating to impact. Materials such as flint, garnet, carborundum and alumina may be used for this purpose.

When only the epoxy resin is used as a binder, it is found that the flow properties of the coating composition are such that the application of the coating to the surface of an aluminum disc by spin coating technique is difficult. It is found that the addition of a quantity of a second polymer, such as the Butvar shown in Example II, improves the flow properties of the resin composition. Flow properties may be improved by adding from 10 to 60% by weight based on the epoxy resin content of a second resin such as the polyvinylacetal resins manufactured by Monsanto and sold under the tradename Butvar resins. Butvar B-79, Butvar B-72A and Butvar B-74 are polyvinyl butyral resins which differ in molecular weight in some degree but which are useful to improve flow properties. For the same purpose, copolymers of vinyl chloride and vinyl acetate, cellulose acetate and cellulose acetate butyrate may be employed.

The composition of the coating materials may be varied from those shown in the examples. For example, the magnetic oxide particle content may lie between 60 and 400 parts of magnetic oxide per hundred parts by weight resin and the solvent content may range from about 100 to 400 parts of solvent per hundred parts of combined oxide and binder mixture. These composition variations have the effect of permitting control of the magnetic density of the coating layer laid down on the substrate.

What is claimed is:

1. A magnetic coating composition comprising a dispersion of magnetic particles in a solution of an epoxy resin having an average of between one and three epoxy groups per molecule and having an epoxy equivalent in the range about 400 to 4,000 and containing an organic acid selected from the group consisting of formic, acetic and propionic acids in amount equal to from 2 to 20% by weight of the contained magnetic particles.

2. The composition defined in claim 1 wherein the acid is formic acid.

3. The composition defined in claim 1 wherein the acid is formic acid and contains a polyvinylacetal resin in amount equal to from 10 to 50% by weight of the contained epoxy resin.

4. The method of preparing a magnetic coating composition which comprises
    a. forming a mixture of magnetic particles, a solution of an epoxy resin having an average of between one and three epoxy groups per molecule and having an epoxy equivalent in the range about 400 to 4,000 and an organic acid selected from the group consisting of formic, acetic and propionic acids, the quantity of acid being equal to from 0.5 to 5% of the weight of the magnetic particles,
    b. milling the mixture to disperse the magnetic particles in the solution,
    c. adding to the milled mixture a solution of a polyvinylacetal resin having a resin content amounting to 10 to 50% by weight of the epoxy resin and a further quantity of said organic acid sufficient to bring the total acid content to a level equal to from 6 to 20% by weight of the weight of the magnetic particles.

* * * * *